United States Patent [19]
Anderson et al.

[11] 3,774,265
[45] Nov. 27, 1973

[54] METHOD AND APPARATUS FOR BREAKING ANIMAL CARCASSES AND HANDLING MEAT PRODUCTS

[75] Inventors: A. D. Anderson, Sioux City, Iowa; Walter E. Lauridsen, South Sioux City, Nebr.; Charles L. Overstreet, Sioux City, Iowa

[73] Assignee: Iowa Beef Processors, Inc., Dakota, City, Nebr.

[22] Filed: July 15, 1971

[21] Appl. No.: 165,787

Related U.S. Application Data

[62] Division of Ser. No. 706,557, Feb. 19, 1968, Pat. No. 3,593,369.

[52] U.S. Cl. ............................. 17/24, 17/1, 17/45, 198/177, 214/59
[51] Int. Cl. .............................................. A22b 7/00
[58] Field of Search ................. 17/1, 24, 44.2, 44.3, 17/45; 214/57–59; 198/177

[56] References Cited
UNITED STATES PATENTS
2,661,828  12/1953  Vogt et al. ...................... 198/177 R
3,163,283  12/1964  Kuwertz ......................... 198/177 R
1,971,460  8/1934   McKee ............................ 17/44.3 X
3,111,706  11/1963  Kopp ................................... 17/24

Primary Examiner—Lucie H. Laudenslager
Attorney—Browne, Schuyler & Beveridge

[57] ABSTRACT

A method and apparatus for releasing portions of meat suspended from cords which are engaged on hooks involves movement of a pair of members toward and beyond each other, whereby one member acts as an abutment to hold the hook in a desired orientation and the other member pushes the cord and the meat from the hook.

3 Claims, 5 Drawing Figures

Patented Nov. 27, 1973

METHOD AND APPARATUS FOR BREAKING ANIMAL CARCASSES AND HANDLING MEAT PRODUCTS

This is a division of application Ser. No. 706,557 filed Feb. 19, 1968, now U.S. Pat. No. 3,593,369, dated July 20, 1971.

BACKGROUND OF THE INVENTION

A method which avoids excessive handling of the product includes the insertion of a cord through a portion of the carcass and forming a loop in the cord, and cutting the corded portion from the carcass while supporting it by the cord from a support, preferably another conveyor. The use of a cord in this manner avoids the necessity of placing a number of holes in the meat if it is transferred from one supporting hook to another, and it permits the use of an automatic hook unloading device described below.

A further phase of the invention relates to the apparatus and method of releasing a cord-supported body of meat from a conveyor hook. This includes a pair of relatively movable members, one of which is horizontally aligned with the shank of the hook and the other of which is horizontally aligned either with the meat or the cord, wherein the relative movement of the members results in the proper orientation of the hook and the release of the cord from the hook.

Present methods of subdividing a beef carcass into primal cuts involve substantial amount of manual handling of larger bodies of meat and a relatively inefficient use of the saws and other devices used in their subdivision.

This invention, on the other hand, handles the carcass and some of its heavier subportions in a manner which eliminates all lifting and manual transferring of the meat. This is done by a series of conveyors which pass through cutting stations in a manner which permits the large bodies of meat to be supported by a conveyor after they are separated from the carcass. As used herein, the term "carcass" is intended to include an eviscerated and dressed animal or any subportion thereof such as sides or quarters which cannot conveniently be carried by an ordinary workman.

Figure 1:
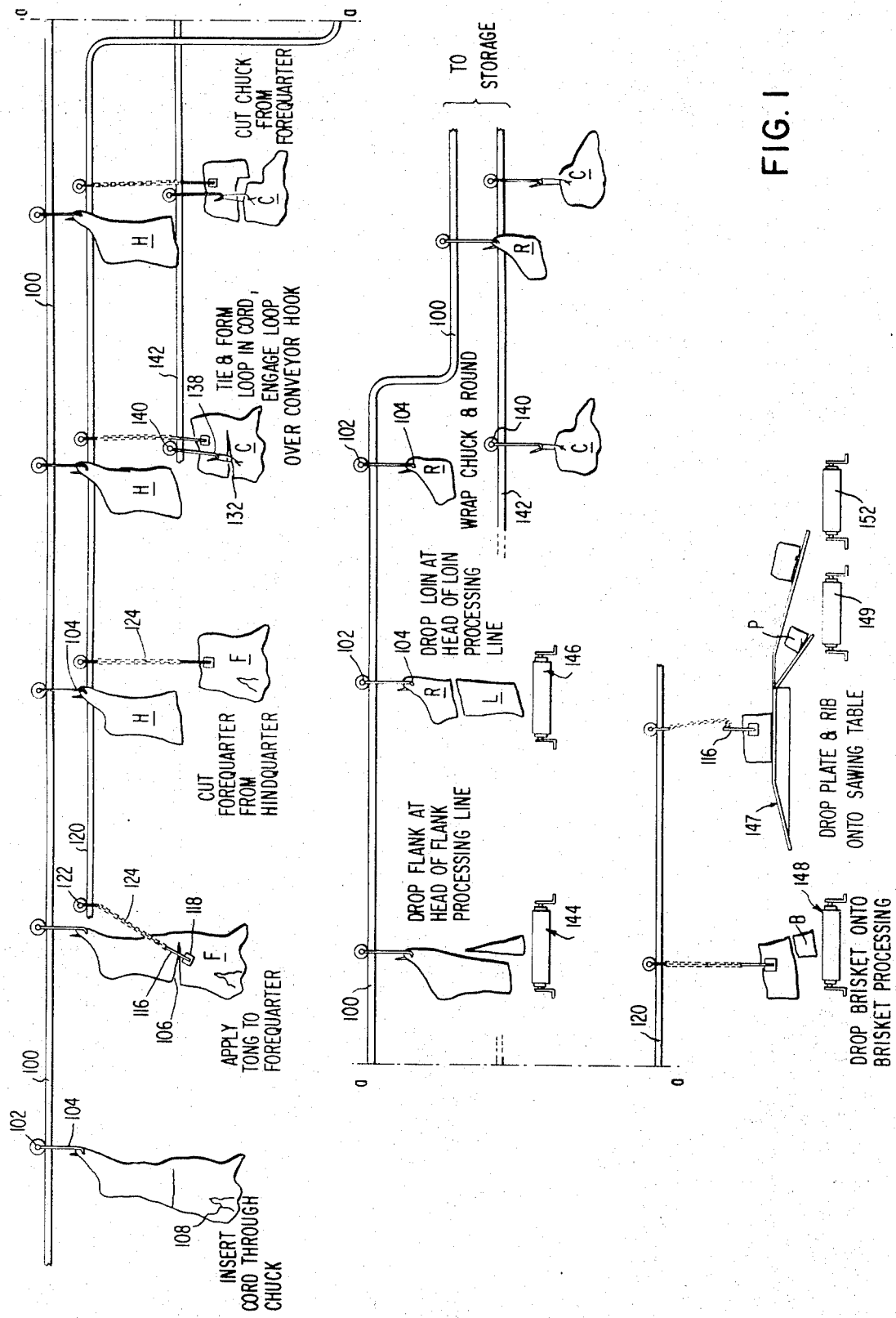
FIG. 1 is a schematic view showing the preferred manner of subdividing a beef carcass into primal cuts.
Figure 2:
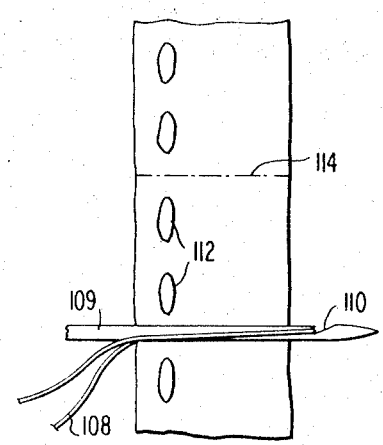
FIG. 2 illustrates schematically the manner in which a cord may be inserted through a body of meat.

A diagrammatic illustration of the method and apparatus for reducing the carcass to primal portions is illustrated in FIG. 1, where initially a side of beef is supported on a conveyor 100 by a trolley 102 which carries the conventional gambrel 104. At an initial station, a worker inserts a cord 108 through the chuck. This is done by using a pointed awl 109 illustrated in FIG. 2 which is provided with an inclined notch 110 for receiving the cord. As used herein, the term "cord" is used to describe any strand-like material, either metallic or non-metallic. Nylon cord is preferred. As illustrated in FIG. 2, this cord is inserted in a location where bones 112 will lie between the cord 108 and the line 114 where the chuck is to be severed from the forequarter. The inclination of the notch 110 in the awl 109 permits the awl to be withdrawn while leaving a loop extending on one side of the chuck.

Returning to FIG. 1, it will be seen that there is a preliminary cut 106 in the carcass at the boundary between the forequarter and hindquarter. Further movement of the side of beef on the conveyor rail 100 brings it to a station where a worker engages the forequarter F with a pair of tongs 116 having a pair of plates 118 which are movable into contacting engagement with the opposite sides of the forequarter.

The tongs 116 are carried by a conveyor rail 120 which supports the trolley 122 and the chain 124 which permits the tongs to swing laterally with respect to the conveyor rail 120 when engaging the forequarter of the side of beef supported on the rail 100. The trolley 122 is moved in synchornism with the trolley 102 on rail 100.

After the tongs 116 are firmly engaged with the forequarter F, the cut is completed to sever the forequarter from the hindquarter so that each will be supported on its respective conveyor rail 100 or 120.

Figure 3:
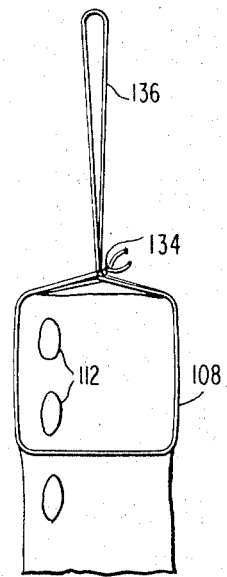
FIG. 3 shows the cord of FIG. 2, arranged to form a loop by which the body of meat may be suspended.

The steps of applying the meat tongs to the forequarter and severing the forequarter from the suspended carcass are also shown in FIG. 3 where the worker 126 is shown in the process of placing the pair of tongs 116 on the forequarter. Once the tongs engage the opposite sides of the forequarter, the weight of the body of meat tends to bring the tongs into more secure engagement with the forequarter and enables the tongs adequately to support the forequarter through the chain 124 or other flexible elongated member which depends from the trolley 122 on the overhead rail 120. The worker 126 then uses a knife to complete the severance of the forequarter F from the hindquarter H. The saws later used for removal of the primal cuts are suspended from retractable cables which relieve the operator from supporting the weight of the saw and permit him to move the saw to the elevation required to make the appropriate cut at his work station. Meat leaving the station illustrated in FIG. 3 includes the hindquarter H supported on the overhead conveyor 100 by a trolley 102, and the forequarter F supported by tongs 116 on the overhead conveyor rail 120.

As the forequarter continues its movement, an incision 132 is made between the chuck C and the remainder of the forequarter. Then, as seen in FIG. 7, the loose ends of the cord 108 are tied together in a double overhand knot 134 and the loop 136 is drawn upwardly so that the lower portion of the cord encircles both the meat and the bone 112 of the chuck. The presence of the bones will avoid tearing of the meat when the chuck is supported by the loop 136. The loop 136 is placed over a hook 138 which is supported on a trolly 140 on a rail 142.

Once the loop 136 of the cord 108 is engaged over the hook 138, another cut may be made to separate the chuck from the forequarter as shown in FIG. 1. The shank may be left attached to the chuck or it may be dropped on the brisket processing line. The chuck is routed to a work area where it is wrapped and then sent to a storage cooler. During all its movement, it may continue to be supported by the trolley 140 as it is moved through the network of handling, sorting, and storage rails.

The hindquarter and the remainder of the forequarter continue moving on their respective rails 100 and 120 through a series of subsequent stations where subportions such as primal cuts are removed therefrom by cutting, preferably by conventional power saws used in the butchering industry.

FIG. 2 shows movement of the hindquarter H to a first station where the flank is dropped at the head of a flank processing line 144, and then to another cutting station where the loin L is cut and dropped at the head of the loin processing line 146, leaving only the round R suspended from the gambrel 104 of the trolley 102.

The rounds and the chucks on the conveyor rails 100 and 142 are moved through a common area where they are wrapped in paper or knit stockinets and then passed along rails where they are weighed and sorted in the manner explained in connection with FIG. 1.

After removal of the chuck, the forequarter moves along the rail 120 through a series of subsequent processing stations where power saws are used to drop primal cuts onto various processing lines. FIG. 2 shows the body of meat moving first to a station where the brisket B is cut and dropped onto the head of the brisket processing line 148. At the final station, the plate and rib are pulled by the conveyor and chain 124 onto a sawing table 147 which is high enough to permit the chain 124 to fall slack and the tongs to open. The plate P and rib are cut apart and pushed into chutes which lead to the heads of the plate processing line 149 and rib processing line 152.

Although there are many ways in which the conveyors may be organized for performing the operation illustrated in FIG. 2 it has been found advantageous and convenient to use a power and free conveyor system for the rails 100 and 142. In such systems, which are well known in the art, there are power sections in which driving dogs engage the trolleys 102 and 140 to move them positively along a power section of the rail. Typical power and free conveyor systems are shown by U.S. Pat Nos. 1,921,109 and 2,510,318. At the end of the power section, the trolleys 102 and 140 may be released onto free or nonpowered rails where they may be moved manually or gravitationally by a slightly inclined rail. This arrangement is particularly convenient in handling the chucks and rounds since it permits them to remain on the same trolley throughout all steps of their processing and storage. In the arrangement disclosed in FIG. 1, there is no necessity for releasing the trolleys 122 for free travel since the tongs 116 are empty at the end of their line. Therefore, a conventional chain-driven power conveyor may be used in connection with the rail 120.

Preferably, movement of the trolleys 102, 122 and 140 are synchronized and they are moved through the various cutting stations in a same direction and at a constant and equal velocity. In the stations where the forequarter is cut from the hindquarter and the chuck is cut from the forequarter, the involved conveyor rails should be parallel.

Another practical consideration involves the efficient utilization of floor space and, in this connection, it has been found desirable to arrange the conveyors so that the rail 120 is horizontally spaced between the rails 100 and 142. This permits the tongs 116 to swing in one direction on the chain 124 when removing the forequarter from the side of beef and then to swing in an opposite direction when removing the chuck from the forequarter.

Figure 4:
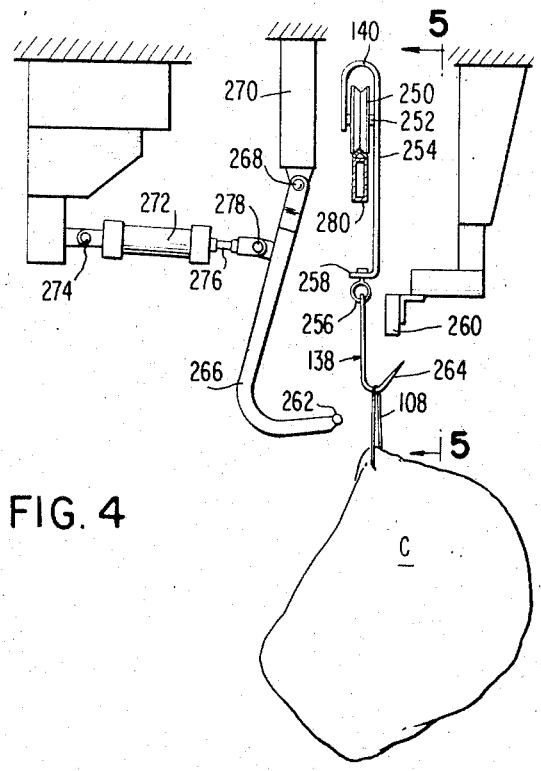
FIGS. 4 and 5 illustrate an apparatus for releasing a cord-supported body of meat from a conveyor hook.
Figure 5:
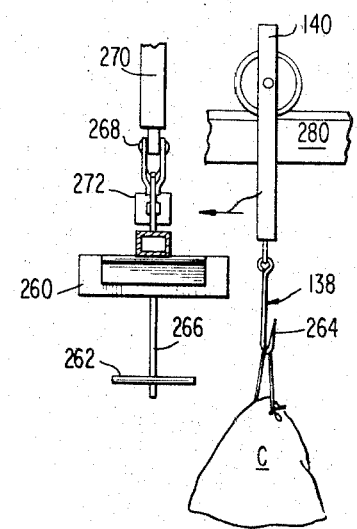

FIGS. 4 and 5 show a device capable of automatically releasing a chuck or other cord-supported body of meat from a conveyor hook 138.

The trolley 140 shown in FIG. 4 includes a trolley roller 250 supported on an axle 252 which passes through both sides of a trolley bracket 254. The hook 138 is supported on an eye rivet 256 which, in turn, is rotatably received in a horizontal flange 258 of the trolley bracket 254.

The trolley 140 follows a path between the two members 260 and 262 which are used to disengage the cord 108 from the hook 138. The member 260 is located on one side of the path taken by the hook 138 and is horizontally aligned with the shank portion of the hook at an elevation above the upturned end portion 264 of the hook. The other member 262 is located on an opposite side of the path taken by the hook 138 and is movable to a position below the hook, preferably against the cord 108 closely adjacent to the hook. The member 262 is carried at the end of an arm 266 which is pivotally mounted at 268 to a stationary support 270. A fluid operated ram 272 is anchored at 274 to a stationary support and has its rod 276 pivotally connected at 278 to the arm 266. The ram 272 is connected to a source of fluid pressure which will operate in a usual manner to extend the rod 276 to move the arm 266 in a clockwise direction, thus bringing the member 262 against the cord 108.

Initially, the movement of the member 262 to the right when viewed from the position of FIG. 4 will cause the trolley 140 to incline slightly on the rail 280 so that the shank of the hook 138 will rest directly against the stationary member 260. In the event that the end portion 264 of the hook is pointing in any direction other than that shown in FIG. 4, the movement of the member 262 against the cord 108 will tend to turn the hook to the position shown in FIG. 4 to facilitate release of the cord 108 from the hook.

As the member 262 continues its movement and passes to the right and beyond the member 260, the cord 108 will be forced up the end portion 264 of the hook and the body of meat and the cord will be released.

A suitable and preferred location of the arrangement illustrated in FIGS. 4 and 5 is at the loading docks. At this location, a belt conveyor may underlie the position where the meat is released, with the discharge end of the belt conveyor lying within the load-carrying portion of the truck or other transport vehicle.

FIG. 5 shows the suspended body of meat moving toward the discharge station where it will be released by the coaction of the members 260 and 262 with the hook 138 and cord 108. The action of the ram 272 may be initiated by any suitable automatic sensing means which detects the presence of the trolley 140 between the members 260 and 262 at the unloading station.

This specification has dealt solely with preferred embodiments of the methods and apparatus used in a meat processing plant. Many of the manipulative steps and elements are capable of use in other phases of a meat breaking, fabricating and handling operations. Throughout the specification and particularly in the claims which follow, the terms used are intended to be given their broadest interpretation considered in light of the present state of the art.

We claim:

1. The method of handling a body of meat comprising the steps of inserting a cord through the meat and forming a loop in the cord, placing a hook with a shank and an upturned end portion into said loop to form a load constituting the hook, cord and meat, moving the hook and the meat supported thereon to a conveyor unloading station, contacting the opposite sides of the load with different members and moving a said member relatively toward and beyond the other said member with a first said member contacting the shank of the hook above the end portion and a second said member contacting the load below the hook; whereby the cord passes over the upturned end portion of the hook so that the meat and the cord are released from the hook.

2. The method according to claim 1 including the step of cutting the said meat from a larger body of meat after placing the hook in said loop.

3. A conveyor having depending load-supporting hooks and an unloading device for removing loads from the hooks, each hook having a shank and an upturned end portion, said unloading device having a pair of relatively movable members on opposite sides of the path taken by the hooks on the conveyor, one of said members having a position horizontally aligned with the shank at an elevation above said upturned end portion, the other of said members being located below said hook, means for rotatably supporting the hook to permit it to point away from the one of said members, and means for moving the members relatively toward and beyond each other whereby the one said member holds the hook and the relative movement of the members turns the hook to a position pointing in the direction of the one of said members and pushes a load over the upturned end portion of the hook.

* * * * *